Dec. 19, 1933.  J. E. BOLLING  1,939,655
HUMIDIFIER FOR HEATING SYSTEMS
Filed June 14, 1929   3 Sheets-Sheet 1
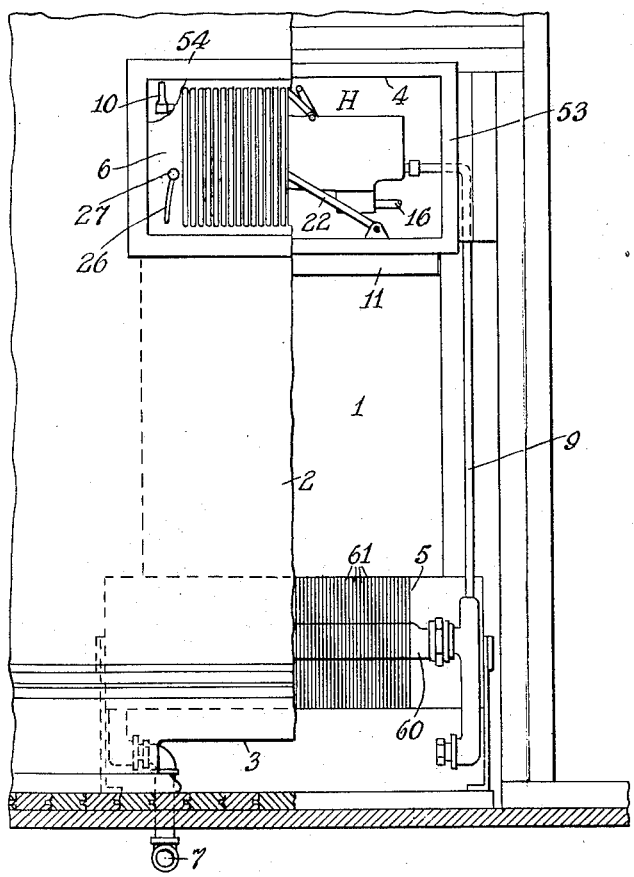
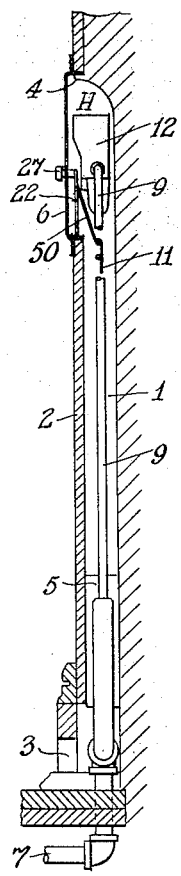
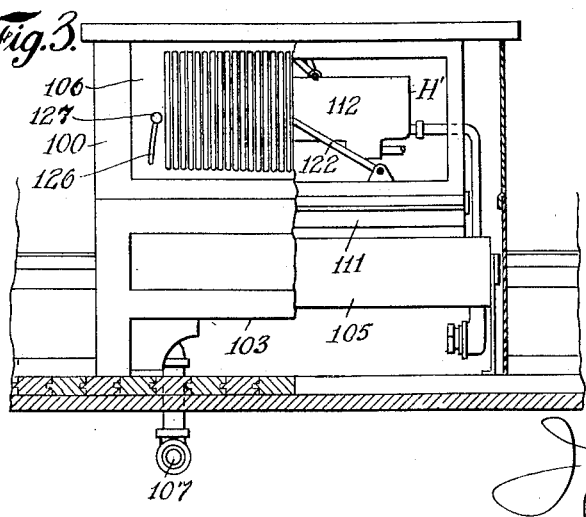
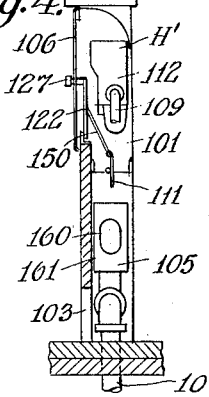
INVENTOR
John Easten Bolling
BY
Louis Prevost Whitaker
ATTORNEY

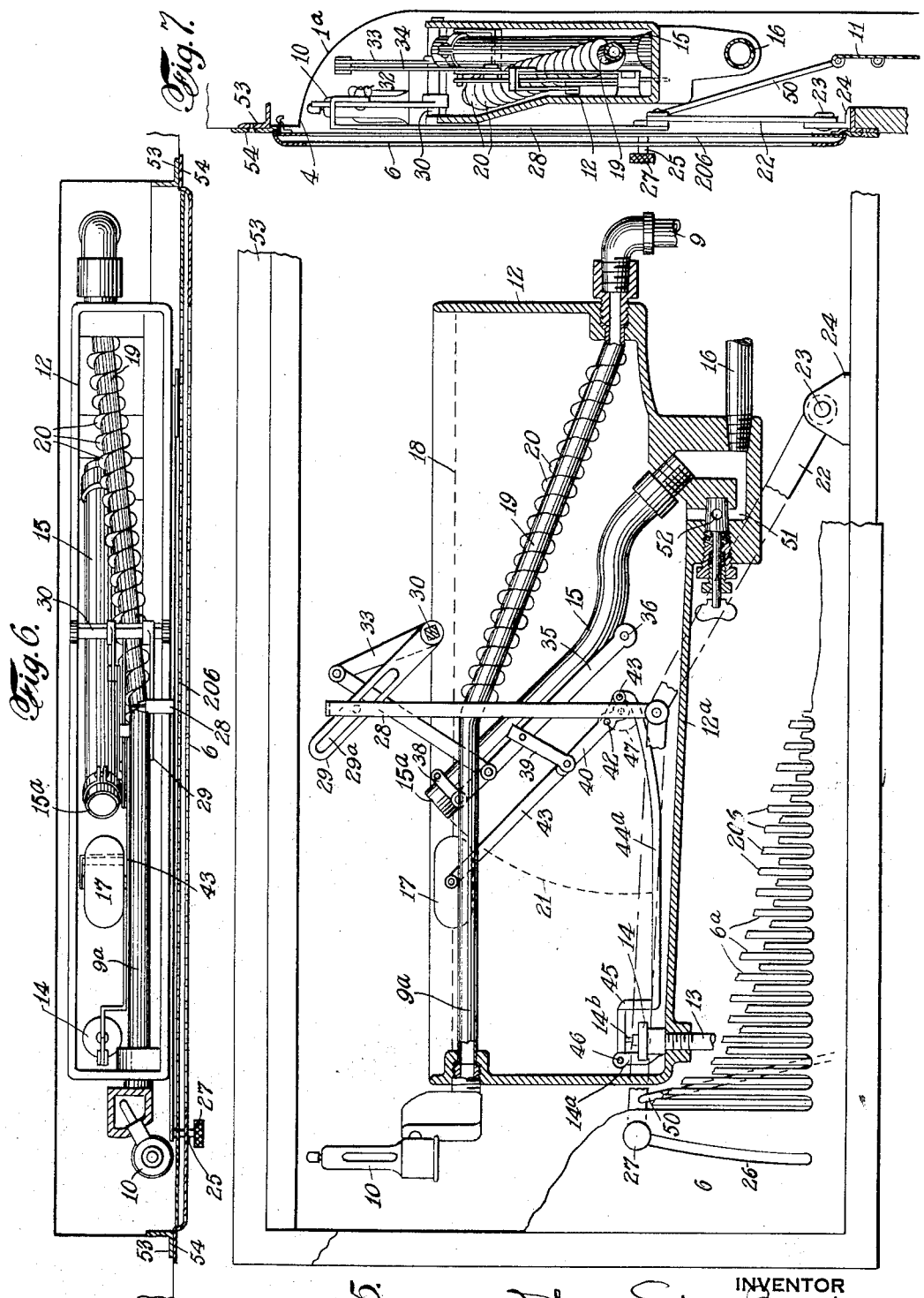

Dec. 19, 1933.   J. E. BOLLING   1,939,655
HUMIDIFIER FOR HEATING SYSTEMS
Filed June 14, 1929   3 Sheets-Sheet 3

INVENTOR
John Easten Bolling
BY
Louis Prevost Whitaker
ATTORNEY

Patented Dec. 19, 1933

1,939,655

UNITED STATES PATENT OFFICE 1,939,655

HUMIDIFIER FOR HEATING SYSTEMS

John Esten Bolling, East Orange, N. J.; Mary W. Bolling, administratrix of said John Esten Bolling, deceased Application June 14, 1929. Serial No. 370,916

12 Claims. (Cl. 237—78)

My invention consists in the novel features hereinafter described, reference being had to the accompanying drawings which show an embodiment of my invention selected by me for purposes of illustration, and the said invention is fully disclosed in the following description and claims.

The object of my invention is to provide an air humidifying device which is applicable to any form of heating apparatus, but is particularly adaptable to the new concealed radiator system, and which is readily applicable to the heating system for private homes where it will be sufficient to equip one or a small number of the heating units with the humidifying apparatus, and to the heating systems of hotels and office buildings in which substantially all the heating units are so equipped.

In carrying out my invention, I provide an air humidifying device in which a constant supply of water is maintained to be vaporized by the application of heat, preferably from a submerged pipe or coil through which the heating fluid, steam, vapor or hot water, used in the heating system is passed, the device being preferably located within a casing through which the heated air from an adjacent heating unit of the heating system passes into the room to be heated, so as to discharge the vapor into the air stream. Means are provided for varying the rapidity of vaporization, preferably by varying the extent of heating surface submerged in liquid under the action of suitable control mechanism, which is interconnected with damper mechanism for controlling the circulation of heated air through the casing, by adjustable means permitting an initial independent adjustment of the humidifying device and damper respectively, to obtain the desired percentage of vapor to be furnished, after which said interconnections permit of a simultaneous adjustment of the damper mechanism and of the humidifier, to maintain the desired percentage of vapor under variations of the quantity of heated air circulated past the heating unit. The casing enclosing the humidifier is also provided with a removable grill for the discharge of the heated and humidified air, which grill may be readily removed to afford access not only to the humidifier, but also to an air valve for venting the heating units if such an air valve is employed.

My invention also comprises certain novel features of construction and combination of parts hereinafter fully described and particularly pointed out in the claims.

Referring to the accompanying drawings,

Fig. 1 represents a front view partly broken away, showing my humidifying apparatus arranged in connection with a heating unit of a concealed radiator heating system.

Fig. 2 represents a vertical sectional view of Fig. 1.

Fig. 3 represents a front view partly broken away, showing my humidifying device arranged in a casing for an exterior heating unit.

Fig. 4 is a vertical sectional view of the apparatus shown in Fig. 3.

Fig. 5 is an enlarged view of the humidifying device partly in elevation and partly in section.

Fig. 6 is a top plan view of the same partly in section.

Fig. 7 is a vertical section of the humidifying apparatus showing the interconnection with the damper mechanism.

Figures 8, 9:
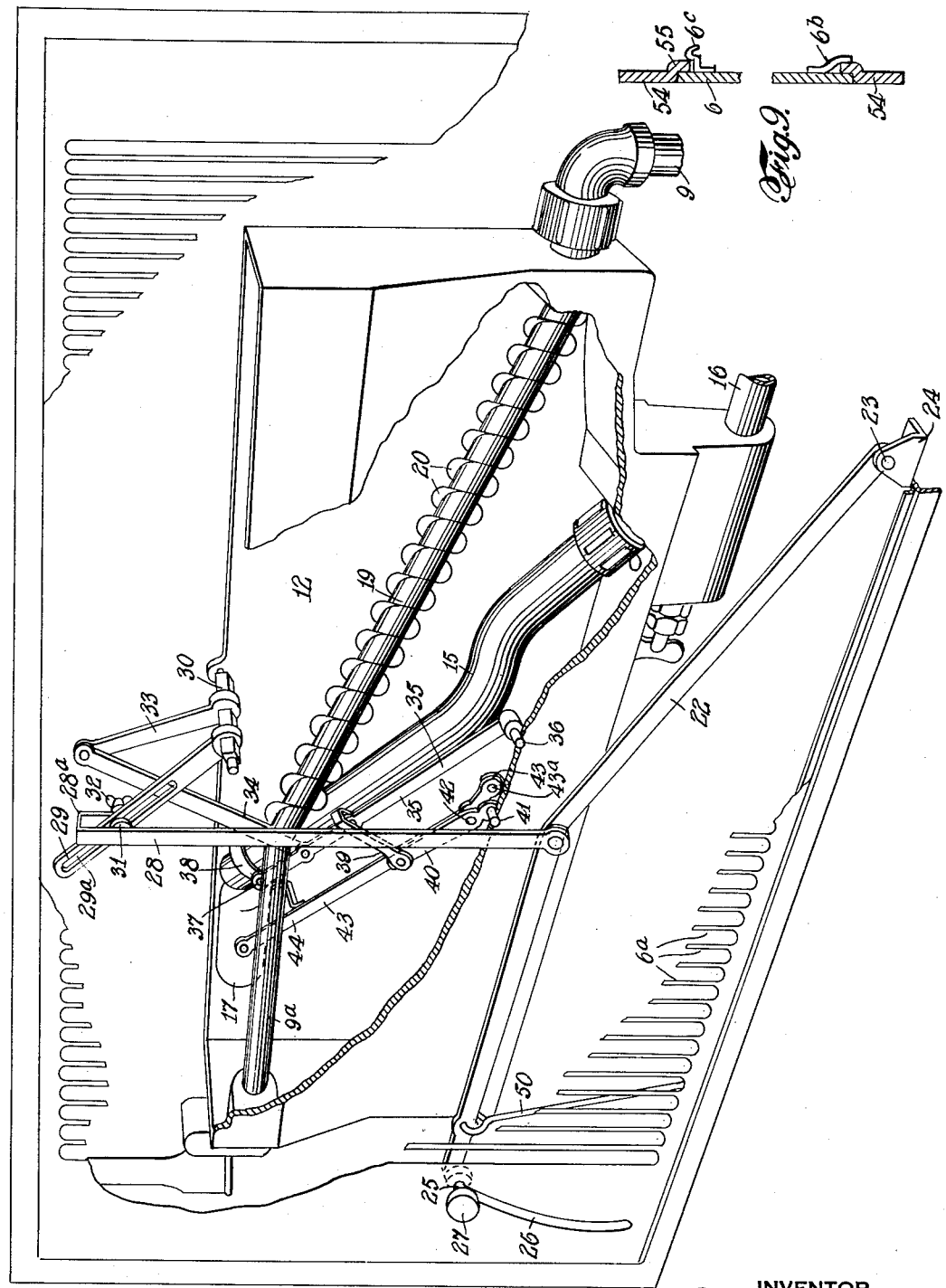
Fig. 8 is a perspective view partly broken away of the humidifying device.
Fig. 9 is a detail sectional view showing the means for detachably supporting the removable grill.

In Figs. 1 and 2, I have shown my invention applied to a heating unit of what is termed the "concealed radiator system", in which the heating units are entirely concealed in a recess in the wall. As ordinarily constructed, each unit of the system comprises a vertical stack, in this instance represented by the recess, 1, in the wall, which is closed at the front by a partition, 2, flush with the wall, except for an inlet aperture, 3, at the bottom and an outlet aperture, 4, at the top. 5 represents a main heating unit which is located adjacent to the bottom of the stack, and while it may be loosely termed a radiator, it is technically a non-radiating conductor for heating the air entering the inlet aperture, 3, and causing it to ascend through the stack, 1, and to be discharged through the aperture, 4, which in this instance is provided with a removable grill, indicated at 6. These non-radiating conductors usually comprise a tube, 60, of thin sheet metal, as copper, for receiving the heating fluid, said tube being provided with a large number of projecting fins, 61, to assist in transmitting the heat to the air. The main heating unit, 5, may be heated by steam, vapor or hot water, and may be of any desired type, and in the case of steam or vapor may be of the single pipe or return pipe system. In this instance the main heating unit, 5, is shown connected with a supply pipe, 7, and is also provided with a pipe, 9, extending to a point immediately in rear of the removable grill, where it is provided with the usual automatic air vent, 10, for freeing the heating unit of air. This arrangement gives access to the vent valve or air valve, without the necessity of providing a special opening in the wall adjacent to the main heating unit. 11 represents a heated air regulating device or damper in the stack, preferably immediately below the grill, by means of which the amount of heated air admitted to the room may be regulated, as hereinafter described, without cutting off the supply of heating fluid to the main heating unit.

In the upper portion of the stack and preferably immediately in rear of the removable grill, 6, is located the humidifying device, which is thus adapted to discharge water vapor, as hereinafter described, into the stream of heated air. The humidifying device is indicated as a whole by the letter H in Figs. 1 and 2, and is shown in detail in Figs. 5, 6, 7 and 8 in its preferred form.

Referring to Figs. 5, 6, 7 and 8 particularly, 12 represents a water tank or container, suitably supported in the upper portion of the stack and supplied with water through a supply pipe, 13, connected with the water main of the building, under the control of an automatic float operated valve, indicated at 14. The tank, 12, is also provided with a overflow pipe, indicated at 15, which connects with a waste pipe, 16, at the bottom of the tank leading to a sewer connection. A float, 17, operatively connected with the inlet valve, 14, is constructed to maintain the desired water level in the tank, indicated by the dotted lines, 18, in Fig. 5 for example. Within the tank, 12, is a water heating unit, indicated at 19, preferably in the form of a tube provided with a heat conducting fin or fins, 20, of any usual or desired form, and supplied with heating fluid, in this instance from the pipe, 9, leading to the vent valve or air valve, 10. The water heating unit, 19, has portions located at different elevations above the bottom of the tank. In this instance it is shown as a straight pipe inclining upwardly with respect to the bottom of the tank and having its upper end connected by a pipe, 9a, with the air vent, 10, and as shown is completely submerged in the water in the tank. This obviously gives the maximum amount of vaporization, but I prefer to provide means for varying the amount of vapor supplied to the heated air, by varying the amount of heating surface of the water heating unit, 19, which is submerged in the water. This result is most conveniently obtained by varying the water level to be automatically maintained in the tank.

In order to accomplish this result, I preferably provide means for varying the position of the upper end of the overflow pipe, 15, and correspondingly varying the position of the float, 17, when raised sufficiently high to close the inlet valve, 14. In the preferred form of my invention illustrated herein, I form the overflow pipe, 15, of flexible metal piping and support it in an inclined position, as shown best in Figs. 5 and 8, so that the upper end of the overflow pipe, indicated at 15a, may be swung downward through the arc, indicated by dotted lines at 21 in Fig. 5, toward the bottom of the tank, thus regulating the water level in the tank and submerging more or less of the water heating unit, 19, in the water. Obviously the greater the amount of surface of the water heating unit, 19, which is submerged in the water, the greater will be the amount of heat directly applied to the water to vaporize the same. Any suitable adjusting means accessible to the operator may be employed for changing the elevation of the upper end of the overflow pipe, 15. In the present instance, as best shown in Fig. 8, I have illustrated for this purpose the lever, 22, pivoted at one end at 23, to a bracket, 24, which may be secured to the framework supporting the removable grill, the other end of said lever being movable vertically by means of a stud, 25, extending through a slot, 26, in the removable grill, and provided with a detachable finger piece, 27, which may be conveniently screwed thereon, as indicated in Fig. 6. The lever, 22, is connected by a vertical link, 28, with a slotted arm, 29, on a rock shaft, 30, extending across the upper part of the tank, the link, 28, extending on the front side of the tank and having a downwardly extending arm, 28a, provided with a shoulder bolt, 31, and wing nut, 32, by which its connection with the slotted arm, 29, may be adjusted in a well known way. The rock shaft, 30, is provided with a second arm, 33, connected by a link, 34, with arm, 35, pivoted to the front wall of the tank at 36, and having its outer end pivotally connected at 37, with a clamp, 38, surrounding and supporting the upper end of the flexible overflow pipe, 15.

It is obvious that when the finger piece, 27, is depressed so as to carry downward the lever, 22, the upper end of the overflow pipe will be correspondingly lowered, thus lowering the water level in the tank and reducing the amount of heating surface of the water heating unit, 19, which is submerged in the water. If, however, the connections between the float, 17, and the inlet valve, 14, were not correspondingly altered, there would be a continual overflow of water through the waste pipe, and to avoid this I provide means for correspondingly varying the connections between the float, 17, and the inlet valve, 14.

In the present instance the lever, 35, previously referred to, which supports the upper end of the overflow pipe, is connected by a link, 39, with the outer end of a lever, 40, the lower end of which is pivoted at 41, to the front of the tank and carries a stud, 42, upon which the float lever, 43 is pivoted. The upper end of the float lever, 43, is provided with a yoke, 44, pivotally connected with the float, 17, and the lower end of the float lever, which projects on the other side of its pivotal connection, 42, is pivoted at 43a, to a lever, 44a, having an angular portion, 45, at its opposite end, pivotally connected at 46, with a lug, 14a, on the valve, 14, and engaging the stem, 14b, of the valve in such manner that the lowering of the float, 17, will raise the lever, 44, and permit the inlet valve to open. The construction of these parts is such that when the upper end of the overflow pipe, 15, is lowered, the point of pivoting, 42, of the float lever is likewise shifted through an arc, indicated by the dotted lines at 47, so that the float will maintain the water level at all times just below the lowest point of the discharge end, 15a, of the overflow pipe, 15. It will thus be seen that the vaporization of the water in the tank, 12, is mainly effected directly by the heating fluid supplied to the main heating unit, 5, and that by adjusting the position of the finger piece, 27, in the slot, 26, the water level in the tank can be raised or lowered to produce the desired amount of vapor for the air passing through the stack, by varying the extent to which the water heating unit, 19, is submerged in water. I do not, however, limit myself to the particular details of the various connections by which this result is accomplished.

The adjusting lever, 22, is also interconnected with the damper mechanism, 11, which controls the flow of heated air through the stack. This may be accomplished in various ways, but in this instance I have shown a connecting link, 50, connecting the lever, 22, with the damper, 11, in such manner that when the lever is depressed to effect a lowering of the water level in the tank and a decrease in the amount of vaporization, the damper, 11, will be simultaneously moved toward the closed position, so that less heated air will pass through and be discharged from the stack, thus cutting off the supply of vapor correspondingly with the cutting off of the heated air and maintaining the amount of vapor furnished at all times in substantially the same proportion to the amount of heated air flowing through the stack. By loosening the wing nut, 32, and adjusting the stud or bolt, 31, in the slot, 29a, of the arm, 29, an initial adjustment can be made to give the desired proportion of vapor for the amount of air flowing through the stack at different positions of the damper, 11, and thereafter a movement of the lever, 22, in either direction will simultaneously control both the amount of air and the amount of vapor delivered from the humidifying device, and maintain the proportion so established.

I also provide means for draining the tank completely at intervals when this is desirable for the purpose of removing therefrom dust particles which may settle on the surface of the water and sink to the bottom of the tank. In order to remove the sediment at the bottom of the tank to best advantage, I preferably provide the tank with a downwardly inclined bottom portion, indicated at 12a, leading to a point near the waste pipe, 16, and provide a supplemental waste passage, 51, from the lowest portion of the bottom, communicating with the waste pipe and provided with a cut-off cock, shown at 52. By opening this cock the tank can be completely emptied, and as the lowering of the float will open the inlet valve, 14, fresh water will be admitted and the tank may be thoroughly flushed, after which the cock, 52, is closed and the water level will return to normal, as regulated by the adjusted position of the overflow pipe and float valve lever.

The upper portion of the stack, preferably termed the "boot" of the stack, is provided preferably with a curved deflecting surface, indicated at 1a, to deflect the heated air which rises around the humidifying device, outwardly through the discharge aperture, 4. The discharge aperture is preferably surrounded by a rectangular metal frame, indicated at 53, which may be set into the wall with one face flush therewith and covered by a rectangular facing, indicated at 54, secured to the frame, 53, by screws or otherwise. The grill, 6, which is provided with suitable apertures, as vertical slots, 6a, for the discharge of the heated and moistened air, is preferably detachably supported either by the frame, 53, or the rectangular facing, 54. In the present instance the inner edges of the rectangular facing, 54, is shown bent inward at 55, to form a recess to receive the grill, 6, see Fig. 9, the lower portion of the grill being provided with lugs, 6b, to hook over the inwardly bent portions of the lower horizontal member of the facing, 54, and the upper portion of the grill being provided with spring clips, 6c, adapted to snap into engagement with the inwardly bent portions, 55, of the upper horizontal member of the rectangular facing, as clearly shown in Fig. 9. This construction will hold the grill in position, but to remove it, it is only necessary to unscrew the button, 27, and pull outwardly on the upper portion of the grill, so as to disengage the spring clips, 6c, when the entire grill can be lifted out of engagement with the rectangular facing, thus giving access not only to the humidifying device for adjustment or repair, or examination, but also giving access to the air valve, 10, which can be removed, repaired and replaced without disturbing the main heating unit or providing any other aperture in the wall for that purpose.

Thus far I have described the preferred embodiment of my humidifying device and its application to a heating system of the concealed radiator type, in which the main heating unit, the stack and the humidifier are all concealed within a recess in the wall, so that the only part which shows is the grill which can be decorated to harmonize with the wall, or treated in any other manner. It is to be understood, however, that my humidifying device is capable of use with a main heating unit located in the room itself, by providing the heating unit with a suitable casing extending above the main heating unit, so as to provide a space to contain the humidifier and damper, and to provide a sufficient stack or flue to promote the circulation of air upwardly from the main heating unit past the humidifier and thence into the room. Such a cabinet may be constructed to take the place of the ordinary household radiator, where it is desired to install the heating and humidifying apparatus in buildings already constructed in which the recesses in the walls are not available. In Figs. 3 and 4 I have illustrated such a cabinet, the parts therein shown which correspond with those previously described being given the same reference numerals with the addition of 100. In these figures 100 represents a cabinet which may be made of sheet metal, or other suitable material, and is supported on the floor in the same manner as an ordinary radiator. 105 represents the main heating unit which is connected in the same manner as previously described, and may be of any suitable type which will provide the necessary amount of heat. The cabinet or casing, 100, forms the vertical stack, 101, for the circulation of air which enters through the inlet aperture, 103, at the bottom of the casing and passes out through the grill, 106, adjacent to the top of the casing. The interior of the cabinet is provided with the damper, 111, above the main heating unit, 105, to permit regulation of the amount of air circulated, and above the damper, in the boot of the stack, is located the humidifying device, indicated at H¹, constructed and operating in exactly the same manner as previously described. The regulating lever, 122, for the humidifier is connected by the link, 150, with the damper 11, so that the supply of heated air and vapor, in substantially uniform proportions, can be obtained at all times. The grill, 106, will be removably supported, as previously described, so that it may be removed to give access to the humidifier and also to the air valve for the main heating unit.

It will be noted particularly that the vaporization of water is mainly effected by means of the heating fluid delivered to the main heating unit, thus providing adequate vaporization of the water to insure the proper proportion of mixture in the air delivered into the room when the apparatus is properly adjusted. While the heated air flowing past the humidifier may have some vaporizing effect on the water, it will be comparatively slight compared to the vaporization effected by the heating unit. No fan or other air forcing device is necessary, as the heat of the main heating unit imparts sufficient motion to the air stream, and therefore the device is noiseless. The vapor from the humdifier diffuses into the air substantially like an ordinary gas and without the aid of a fan, and as the vapor is discharged into the air above the main heating unit, it passes into the stream of warmest air and condensation is prevented.

My invention also permits the use of a damper control for the air as the means of controlling the heat supplied to the room without the necessity of turning off or turning on the heating fluid for the main unit, thus permitting accurate regulation of the temperature of a room, while maintaining a substantially constant ratio of humidity, thus when the damper is closed the supply of heated air is practically shut off and the water level in the humidifier is lowered so as to produce little or no vapor. Obviously there will always be a slight vaporization from the humidifier, but sufficient air will leak past the damper to take up this vapor, and its effect will be negligible when the lever, 22, is moved to shut off the supply of hot air and vapor. It will also be understood that where the device is installed in a cabinet formed of superposed sections, as is the common practice, the top section or boot of the cabinet can be provided with the humidifier and arranged to fit the lower section or sections of standard equipment containing the necessary main heating unit, as indicated for example in Fig. 3, or the humidifier can be placed in any type of cabinet with any suitable heating unit.

It will be understood that the humidifying device will be constructed of such size as to provide the necessary amount of vapor to supply the desired ratio of moisture in the air stream from the main heating unit (or units), and that the proportions of the tank may be varied to that end, and that if necessary the capacity of the water heating unit may be increased in any well known way. In the embodiments herein shown, the wall recess and cabinet of minimum depth have been shown, and these may be varied in accordance with the desires of the constructor.

While I have shown and described herein as my preferred means for regulating the supply of vapor by adjusting the water level in the tank to vary the extent to which a vaporizing heating unit, having portions disposed at different points vertically in the tank, is submerged in water, I do not limit myself to such means of adjustment, as substantially the same results can be obtained by providing adjusting means for raising and lowering the tank itself to vary the extent to which the vaporizing unit is submerged, or by providing means for vertically adjusting the vaporizing means in a stationarily supported tank. These modifications are within the spirit of my invention, but require flexible connections between the vaporizing unit and the connections providing the heating medium therefor in the other case, which render them less desirable in practice. It is also to be understood that my invention is particularly applicable to the type of heating system previously described, in which the air is conducted through a suitable conduit, stack or passage, in contact with the heating unit and discharged into the room under the regulation of suitable damper mechanism, by means of which the amount of heat furnished to the room can be most accurately regulated and the room maintained at a desired temperature, without interfering with the flow of the heating medium, and the regulating means for the humidifier are so associated with the regulating means for the air current or stream, as to permit the independent adjustment of either and thereafter the simultaneous regulation of both to maintain the desired ratio.

It will also be understood that if found desirable a screen may be employed in rear of the grill to conceal the humidifier and the adjusting levers, etc., from view. For example, the grill may be provided on its inner face and spaced therefrom with a secondary grill, as indicated at 206 in Fig. 5, in which the slots may be placed in staggered relation with the slots in the grill, or any other concealing means, which will not interfere with the delivery of heated and moistened air from the apparatus, may be employed.

It will also be understood that the vaporizing unit of the humidifier may be connected in any desired way with the pipes supplying the heating medium, and for example it may be connected in parallel with the heating unit or otherwise as desired, and in such case both the heating unit and vaporizing unit may be provided with air valves.

What I claim and desire to secure by Letters Patent is:—

1. A humidifying unit comprising a water receptacle provided with a water inlet, a controlling valve therefor, a pivoted float lever and float operatively connected with said valve for maintaining a constant liquid level, a waste pipe for said receptacle, and an overflow pipe connected therewith having its inlet end movable vertically with respect to the receptacle, a vaporizing heater having portions disposed at different points vertically in contact with the water in said receptacle, and adjusting means operatively connected with said overflow pipe and float lever for varying the water level to be automatically maintained in said receptacle.

2. The combination with an air conduit provided with an inlet and a discharge outlet, of an air heating device in said conduit, means for supplying a fluid heating medium thereto, and a damper for controlling the discharge of air from said conduit, of a humidifying device in said conduit comprising a water receptacle open at the top to discharge vapor into the heated air in said conduit, a vaporizing heating means in contact with the water in said receptacle having portions located at different points vertically with respect to the water level in said receptacle, means for supplying a fluid heating medium to said vaporizing device, means for automatically maintaining the water level in said receptacle, adjustable means for varying the water level to be automatically maintained, and a controlling device operatively connected with said damper mechanism and with the means for adjusting the water level in said receptacle.

3. The combination with an air conduit provided with an inlet and a discharge outlet, of an air heating device in said conduit, means for supplying a fluid heating medium thereto, and a damper for controlling the discharge of air from said conduit, of a humidifying device in said conduit located above said air heating device, and comprising a water receptacle open at the top to discharge vapor into the heated air in said conduit, a vaporizing device in said receptacle having portions adapted to be submerged in the water and located at different points vertically with respect to said receptacle, means for supplying a fluid heating medium to said vaporizing device, means for automatically maintaining a constant water level in said receptacle, adjustable means for varying the water level to be automatically maintained, a controlling device, connections therefrom to said damper mechanism and to said means for varying the water level in said receptacle, at least one of said connections being adjustable to initially establish a predetermined ratio of heat emission by air flow and quantity of water vaporized, and thereafter to simultaneously regulate both air and vapor to maintain substantially the said ratio.

4. The combination with an air conduit provided with an inlet and a discharge outlet, of an air heating device in said conduit, means for supplying a fluid heating medium thereto, and a damper for controlling the discharge of air from said conduit, of a humidifying device in said conduit located above said air heating device, and comprising a water receptacle open at the top to discharge vapor into the heated air in said conduit, a vaporizing device in said receptacle having portions adapted to be submerged in the water and located at different points vertically with respect to said receptacle, means for supplying a fluid heating medium to said vaporizing device, means for automatically maintaining a constant water level in said receptacle, adjustable means for varying the water level to be automatically maintained, a controlling device, connections therefrom to said damper mechanism and to said means for varying the water level in said receptacle, at least one of said connections being adjustable to initially establish a predetermined ratio of air and vapor, and thereafter to simultaneously regulate both air and vapor to maintain substantially the said ratio, said vaporizing device being provided with an air vent valve adjacent to its upper end, and a removable panel forming part of said conduit to afford access to said humidifier and vent valve.

5. The combination with an air conduit provided with an inlet and a discharge outlet, of an air heating device in said conduit, means for supplying a fluid heating medium thereto, and a damper for controlling the discharge of air from said conduit, of a humidifying device in said conduit located above said air heating device, and comprising a water receptacle open at the top to discharge vapor into the heated air in said conduit, a vaporizing device in said receptacle having portions adapted to be submerged in the water and located at different points vertically with respect to said receptacle, means for supplying a fluid heating medium to said vaporizing device, means for automatically maintaining a constant water level in said receptacle, adjustable means for varying the water level to be automatically maintained, a controlling device, connections therefrom to said damper mechanism and to said means for varying the water level in said receptacle, at least one of said connections being adjustable to initially establish a predetermined ratio of air and vapor, and thereafter to simultaneously regulate both air and vapor to maintain substantially the said ratio, said vaporizing device being connected with said air heating device and receiving its supply of heating fluid therefrom, and having its upper end provided with a vent valve, said humidifier and vent valve being located adjacent the discharge aperture of said conduit, and a removable grill for said outlet aperture.

6. A humidifying unit comprising a water receptacle, means for supplying water thereto, a waste pipe for said receptacle, means for automatically maintaining a predetermined water level in said receptacle including a float operated inlet valve and an overflow pipe, adjustable means for varying the water level to be maintained in said receptacle, a vaporizing heating device in contact with the water in said receptacle having portions at different levels, controlling mechanism connected with said adjustable means, said receptacle being provided with a flushing aperture connecting it with the waste pipe independently of the overflow pipe, and a flushing valve for controlling said aperture.

7. A humidifying unit comprising a water receptacle, a vaporizing heater positioned in said receptacle and adapted to be submerged in the water in said receptacle and having portions located at different levels with respect to said receptacle, and adjustable means for varying the extent to which said vaporizing heater is submerged, to vary the rapidity of vaporization.

8. A humidifying unit comprising a water receptacle provided with a water inlet, an inlet valve for controlling the same, a water outlet, a pivoted float lever and float operatively connected with said inlet valve, an overflow pipe connected with said water outlet and having its overflow opening movable vertically with respect to the receptacle, adjustable means for raising and lowering the position of said overflow opening of said overflow pipe and the pivotal axis of said float lever to vary the height of the water level to be maintained, and a vaporizing heater in contact with the water in said receptacle having portions at different points vertically with respect to said receptacle.

9. The combination with an air conduit provided with an inlet and a discharge outlet, and a damper for controlling the discharge of air from said conduit, of a humidifying device located in the path of the air passing through said conduit and comprising a water receptacle open at the top to discharge vapor into the heated air, a vaporizing heating means in contact with the water in said receptacle having portions located at different points vertically with respect to the water level in said receptacle, means for automatically maintaining the water level in said receptacle, adjustable means for varying the water level to be so automatically maintained, and a controlling device operatively connected with said damper mechanism and with means for adjusting the water level in said receptacle.

10. The combination with an air conduit provided with an inlet and a discharge outlet, and a damper for controlling the discharge of air from said conduit, of a humidifying device located in the path of the air passing through said conduit and comprising a water receptacle open at the top to discharge vapor into the heated air, a vaporizing heating means in contact with the water in said receptacle having portions located at different points vertically with respect to the water level in said receptacle, means for automatically maintaining the water level in said receptacle, adjustable means for varying the water level to be so automatically maintained, a controlling device, connections therefrom to said damper mechanism and to said means for varying the water level in said receptacle, at least one of said connections being adjustable, and said connections being constructed to insure the substantial cessation of vaporization when the damper is closed and heat emission from said conduit ceases.

11. A humidifying unit comprising a water receptacle, a vaporizing heater positioned in said receptacle and in contact with the water in said receptacle and having portions located at different levels with respect to said receptacle, and adjustable means for varying the relative positions of the water level with respect to the portions of the heater in contact with the water, to vary the rate of vaporization.

12. A humidifying unit comprising a water receptacle, a vaporizing heater positioned in said receptacle and in contact with the water in said receptacle and having portions located at different levels with respect to said receptacle, means for automatically maintaining the water level in the said receptacle, and adjustable means for varying the water level to be so automatically maintained to vary the rate of vaporization.

JOHN ESTEN BOLLING.